United States Patent [19]
Takagi et al.

[11] Patent Number: 5,518,373
[45] Date of Patent: May 21, 1996

[54] COMPRESSOR START-UP CONTROLLER

[75] Inventors: Nobukazu Takagi; Kiyohiro Harada; Sakae Mashio, all of Konan; Akihito Uetake, Tokyo; Osamu Shinkawa, Tokyo; Takeshi Fujihisa, Tokyo, all of Japan

[73] Assignees: Zexel Corporation; Epson Corporation, both of Tokyo, Japan

[21] Appl. No.: 197,274

[22] Filed: Feb. 16, 1994

[30] Foreign Application Priority Data

Feb. 16, 1993 [JP] Japan .................. 5-026417

[51] Int. Cl.$^6$ .................................. F04B 49/06
[52] U.S. Cl. .................. 417/45; 417/12; 417/14; 417/278; 417/410.5
[58] Field of Search .................. 417/12, 14, 45, 417/278, 410.5; 418/14; 318/430, 431

[56] References Cited

U.S. PATENT DOCUMENTS

| | | | |
|---|---|---|---|
| 4,389,171 | 6/1983 | Eber et al. | 418/14 |
| 4,510,422 | 4/1985 | Ogura | 318/254 |
| 4,759,696 | 7/1988 | Ishiai | 418/55 |
| 4,763,347 | 8/1988 | Erdman | 318/254 |
| 4,992,718 | 2/1991 | Kumaki | 318/430 |

FOREIGN PATENT DOCUMENTS

| | | | |
|---|---|---|---|
| 58-222994 | 12/1983 | Japan | 418/14 |
| 61-272481 | 12/1986 | Japan | 417/12 |
| 1-159485 | 6/1989 | Japan | 418/14 |
| 2-81982 | 3/1990 | Japan | 418/14 |
| 3-149390 | 6/1991 | Japan . | |
| 3-099886 | 10/1991 | Japan . | |
| 4-246285 | 9/1992 | Japan | 418/14 |

*Primary Examiner*—Richard A. Bertsch
*Assistant Examiner*—Xuan M. Thai
*Attorney, Agent, or Firm*—Kanesaka & Takeuchi

[57] ABSTRACT

A compressor start-up controller includes a compressing section (37–39) for compressing a refrigerant; a motor (25) connected to the compressing section for rotating the compressing section; a drive circuit (10) connected to the motor for driving the motor; a rotation detecting device (1) connected to the drive circuit for detecting whether the motor is normally rotating; a control unit (8) connected to the drive circuit for operating the motor in a step mode at a very slow rotation at its start-up for effecting electricity conducting control to gradually increase or decrease commutating current at a very slow speed during the step mode operation at the motor start-up.

6 Claims, 8 Drawing Sheets

COMPRESSOR START-UP CONTROLLER

BACKGROUND OF THE INVENTION

1. Field of the Invention

The present invention relates to compressor start-up controllers to control the start-up of a compressor whose interior is filled with a liquid refrigerant.

2. Description of the Related Art

Generally, in the freezing cycle, when a compressor is suspended for a long time or the temperature of a compressor at the start-up is lower than ambient temperature (for example, that of the heat exchanger), the refrigerant is condensed within the compressor, and the gaseous refrigerant is liquefied to fill the compressor interior together with the lubricating oil, resulting in the so-called asleep state. If the compressor is started in this state, the liquefied refrigerant and the lubricating oil within the compressor are liquid-compressed so that the pressure within the compressor is unusually increased. As a result, the bearing of the compressor is damaged or seized, resulting in breakage. If the asleep refrigerant is in a large quantity, even the start-up is impossible.

To prevent the above problems, the following countermeasures have been proposed.

(1) A heater is disposed in the compressor crankcase. The heater is turned on before starting up to evaporate the liquefied refrigerant in the compressor (Japanese UM patent application Kokai No. 3-99,886).

(2) Before starting up, the compressor is rotated reversely to remove the liquefied refrigerant in the compressor from the inlet port (Japanese patent application Kokai No. 3-149,390).

(3) At the start-up, the compressor is driven at a very slow rotation to discharge the liquefied refrigerant from the outlet port so as to operate the compressor as a liquid pump (Japanese patent application No. 3-218,748).

However, the above countermeasure (1) has the following disadvantages: the number of parts is increased, the compressor size is increased, the liquefied refrigerant cannot be removed completely, and the start-up cannot be made instantly.

The above countermeasure (2) has such a disadvantage that the interior liquefied refrigerant cannot be surely flown for removal by the reverse rotation of the compressor.

The above countermeasure (3) suffers from such a drawback that when the compressor is driven at a very slow speed, the angular velocity is increased due to a backlash of the bearing and a residual gas in the compressor at the commutation of a brushless DC motor, causing the compressor to vibrate.

Figure 9:
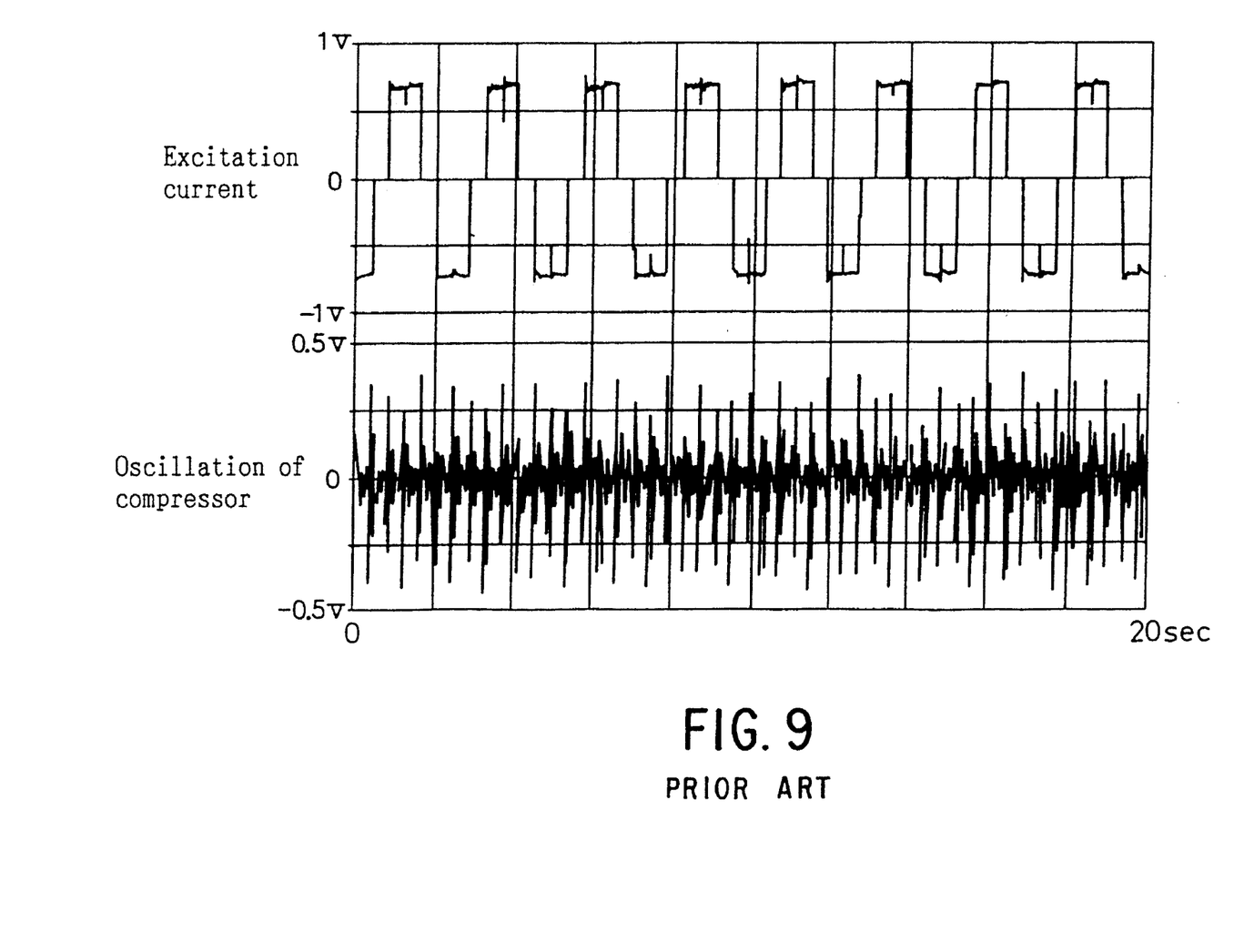
FIG. 9 is a graph showing the excitation and oscillation characteristics of a compressor in prior art.

In addition, the rate of change of exciting current waveform passed to two of the windings of each phase becomes very sharp as shown in FIG. 9, and the vibration of the compressor becomes large due to the backlash and residual gas as shown in FIG. 9.

SUMMARY OF THE INVENTION

Accordingly, it is an object of the invention to provide a compressor start-up controller which can suppress the sharp generation of a torque in a brushless DC motor and lower the generation of vibration and noise at a very low speed operation.

According to the invention, the above object is achieved by gradually increasing or decreasing the commutation voltage, and there is provided a compressor start-up controller which includes a compressing section for compressing a refrigerant; a motor connected to the compressing section for rotating the compressing section; a drive circuit connected to the motor for driving the motor; a rotation detecting means connected to the drive circuit for detecting whether said motor is normally rotating; a control unit connected to the drive circuit for operating the motor in a step mode at a very slow rotation at its start-up through the drive circuit for effecting sensorless operation of the motor when it is under normal rotation and for effecting electricity conducting control to increase or decrease gradually commutating current at a very slow speed during the step mode operation at the motor start-up.

In operation, the step mode operation is first conducted for a certain time (e.g., 1.5 seconds). In the step mode operation, the exciting coil is energized in a certain exciting mode, and the phase is fixed. The duty of the exciting mode is changed while electric current is conducted in the exciting coil during the above certain time. For example, switching control is effected by a control means to gradually increase and then decrease the duty to provide an artificial sine wave within the above certain time.

Thus, an electric current is applied to the motor through the above drive circuit so as to form the artificial sine wave within the aforementioned certain time. Consequently, the motor output is lowered to thereby rotate the motor at a very slow speed. With the excitation in the predetermined order of modes of excitation pattern, the rotor rotates at a very slow speed such as once in a second or even several seconds. With the rotational movement of the rotor, the oscillation scroll member of the compressor oscillates, and the liquid refrigerant in each compression chamber is compressed and gradually discharged. Thus, the compressor itself operates as a pump, and the liquid refrigerant in the compressor is completely removed. Since the motor current at this time is in a quasi-sine wave, the rate of change of exciting current waveform of the motor is less sharp than before. Consequently, the oscillation of the compressor is quite small even if there are backlash and residual gas.

After the lapse of the certain time at the start-up and when the normal rotation of the motor is detected by a rotation detecting means, normal motor control or position sensorless operation is conducted.

The above and other objects, features, and advantages of the invention will be more apparent from the following description when taken in conjunction with the accompanying drawings.

DESCRIPTION OF THE PREFERRED EMBODIMENT

Figure 1:
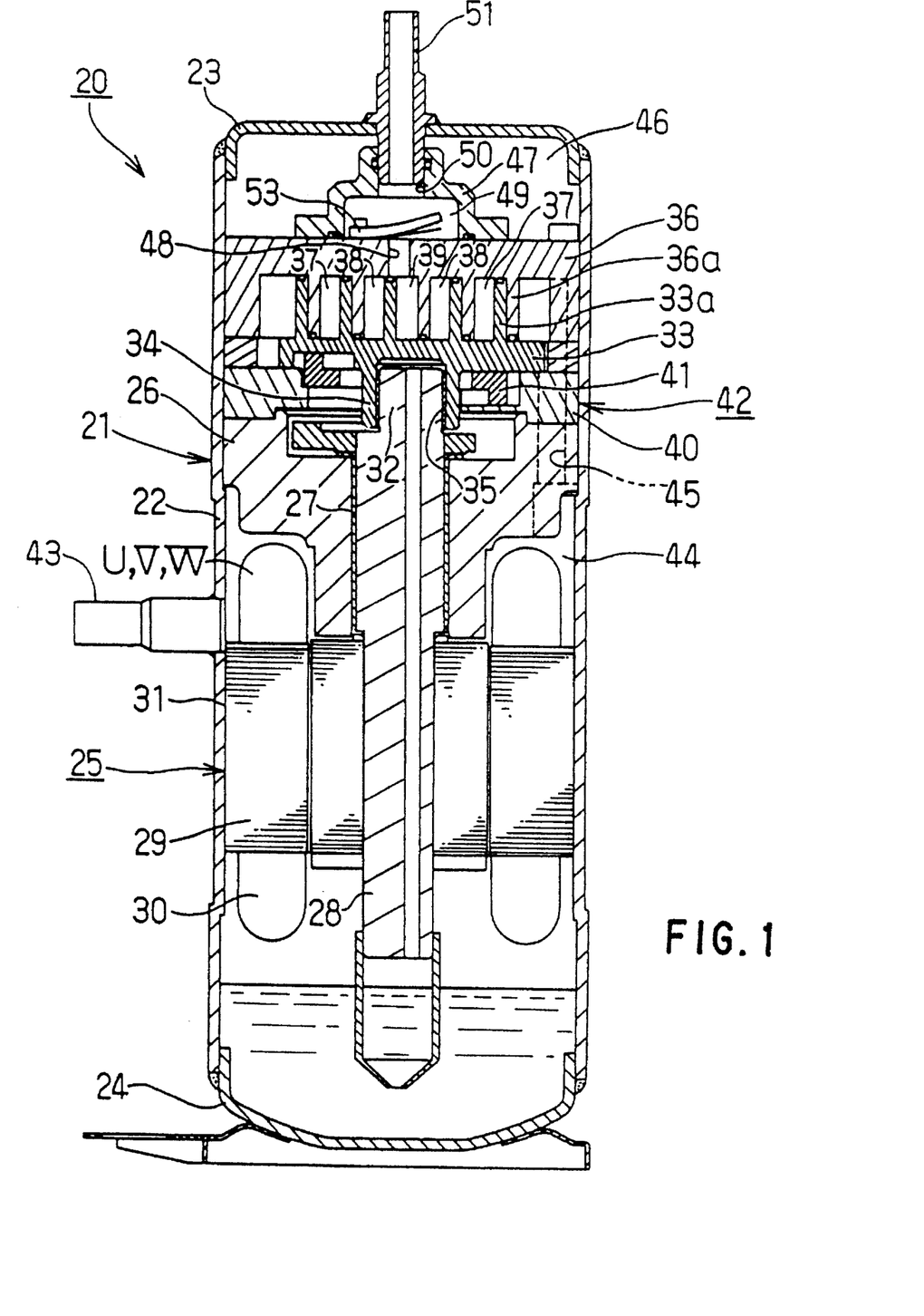
FIG. 1 is a longitudinal section of a compressor according to an embodiment of the invention.

In FIG. 1, a compressor 20 of the scroll type is provided with a sealed case 21 which consists of a cylinder section 22 and top and bottom closing sections 23 and 24, respectively. A brushless DC motor 25 is disposed at the lower part of the case 21. The motor 25 consists of a drive shaft 28 whose upper part is supported by a supporting block 26 via a bearing 27, a rotor 29 fixed to the drive shaft 28, a stator 30 fixed to the case 21, and an exciting coil 31 mounted on the stator 30.

The motor 25 is a position sensorless brushless DC motor which does not have any position sensor for detecting the position of the rotor 29. The rotor 29 has four poles as shown in FIG. 2, and an exciting coil 31 has three phases U, V, and W connected in a star configuration.

A crank shaft 32 is formed on the top end of the drive shaft 28 so as to be eccentric from the axis of the drive shaft 28 by a certain degree. The crank shaft 32 is inserted in a connection insertion portion 34 of an oscillating scroll member 33 via a bearing 35. A scroll 33a of the oscillating scroll member 33 is engaged with a scroll 36a of a stationary scroll member 36 fixed to the case 21. The scrolls 33a and 36a form intake pressure chambers 37, intermediate pressure chambers 38, and a discharge pressure chamber 39 to compress a refrigerant gas by turns. A rotation preventing mechanism 42 consisting of a thrust plate 40 and Oldham's ring 41 is disposed on the back face of the oscillating scroll member 33.

An inlet pipe 43 is attached to the side of the case 21. The pipe 43 is communicated to a low pressure chamber 44 (intake side) in which the motor 25 is disposed and to the intake pressure chamber 37 through an intake port 45 formed in the supporting block 26 and the thrust plate 40. A low pressure top space 46 (intake side) is formed above the stationary scroll member 36 in the case 21. A compartment member 47 is disposed in the top space 46 and fixed to the stationary scroll member 36. A high pressure chamber 49 is formed in the compartment member 47 so as to communicate with a discharge port 48 which is made in the stationary scroll member 36. A connection port 50 is formed on the top of the compartment member 47. A discharge pipe 51 extends upwardly from the connection port 50 to outside of the case 21. The high pressure chamber 49 is formed in a cylindrical cross section, and a reed valve 53 is disposed within the high pressure chamber 49 for opening and closing the discharge port 48. A compression section is formed by the oscillating scroll member 33 and the stationary scroll member 36.

Figure 2:
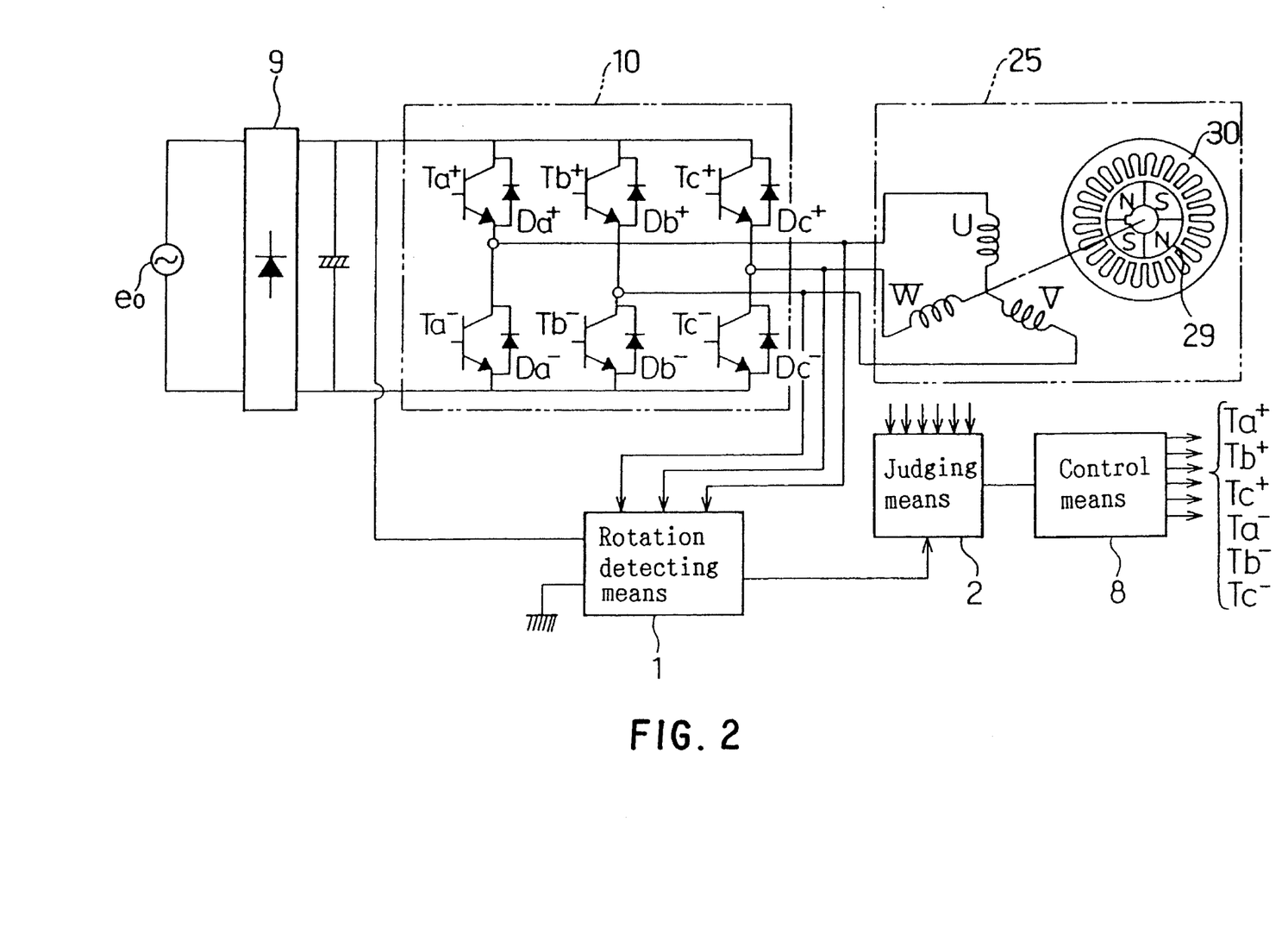
FIG. 2 is a circuit diagram of a drive unit for a motor of the compressor.
Figure 5:
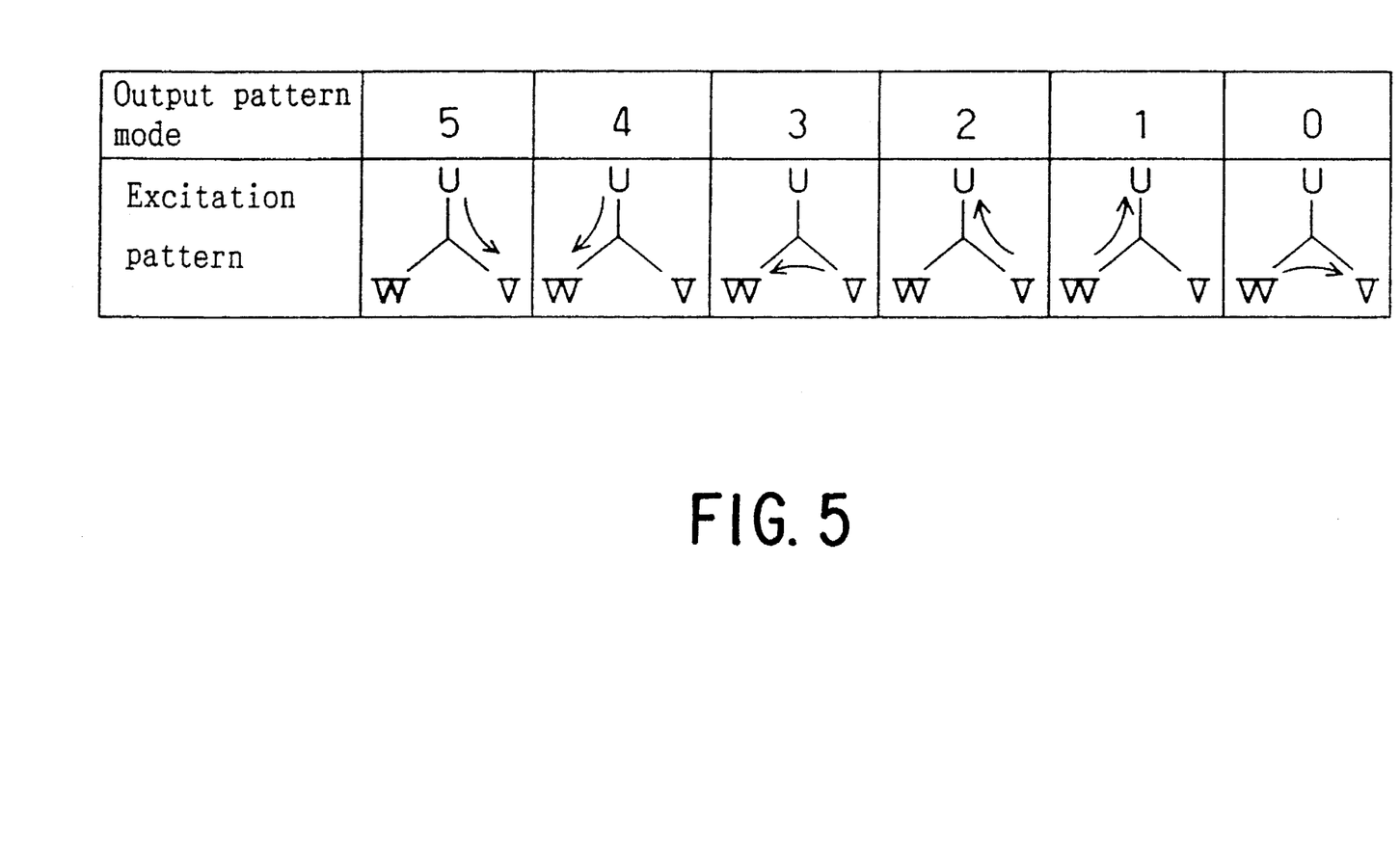
FIG. 5 is a table showing excitation patterns for the motor.

In FIG. 2, a drive circuit 10 is connected to the exciting coils U, V, and W mounted on the stator 30. The drive circuit 10 is formed of a 120°-conduction voltage type inverter circuit and consists of transistors Ta+, Tb+, and Tc+ on the positive side connected with respective positive side reflux diodes Da+, Db+, and Dc+, and transistors Ta−, Tb−, and Tc− on the negative side connected with respective negative side reflex diodes Da−, Db−, and Dc−. Direct currents in three phases are applied by selecting two of the respective phase windings by combining the positive and negative transistors for chopper control to form a magnetic field on the stator 30 to rotate the rotor 29. For example, an exciting pattern for continuing normal operation is set as shown in FIG. 5, and commutation is made in the exciting pattern modes 5-0 so as to drive the motor 25. A driving method of position sensorless brushless DC motor has been made in order to control the drive of the motor 25 ("A constructive method of position sensorless brushless DC motor" by Suzuki, Ogasawara, and Akagi, the 34th National Meeting of Industrial Applied Department of the Electricity Society, 1988). This control method is employed in this embodiment. In FIG. 2, there are provided an AC power source eo and a rectification circuit 9, too.

Figure 3:
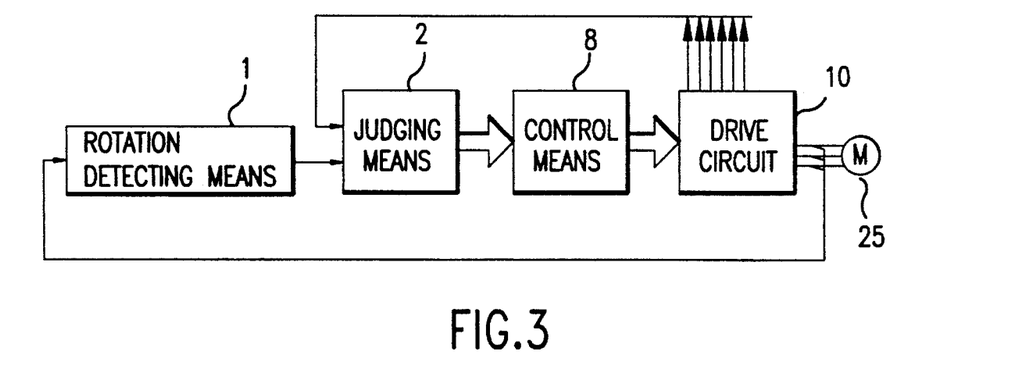
FIG. 3 is a block diagram of a start-up control device of the motor.

A rotation detecting means 1 is connected to the drive circuit 10 for making control at the start-up, and a control means 8 is connected successively as shown in FIGS. 2 and 3. The rotation detecting means 1 detects indirectly a counter electromotive force generated in the respective exciting coils U, V, and W in accordance with the rotation of the rotor 29 so as to detect whether the motor 25 is rotating or not. More specifically, when the rotor 29 rotates, a counter electromotive force is generated in the exciting coil and, due to the counter electromotive force, the reflux diode of the open phase (phase of the exciting coil to which no electric current is applied) becomes in a conductive state that an electric current is applied. In other words, when a terminal voltage of the open phase is changed by the counter electromotive force and the anode electric potential of the reflux diode on the positive side becomes higher than the standard voltage or the cathode electric potential of the reflux diode on the negative side becomes lower than the standard voltage, the reflux diode becomes in the conductive state to supply an electric current. By detecting the diode in the conductive state, the motor rotating state can be detected as a rotational signal.

Figure 4:
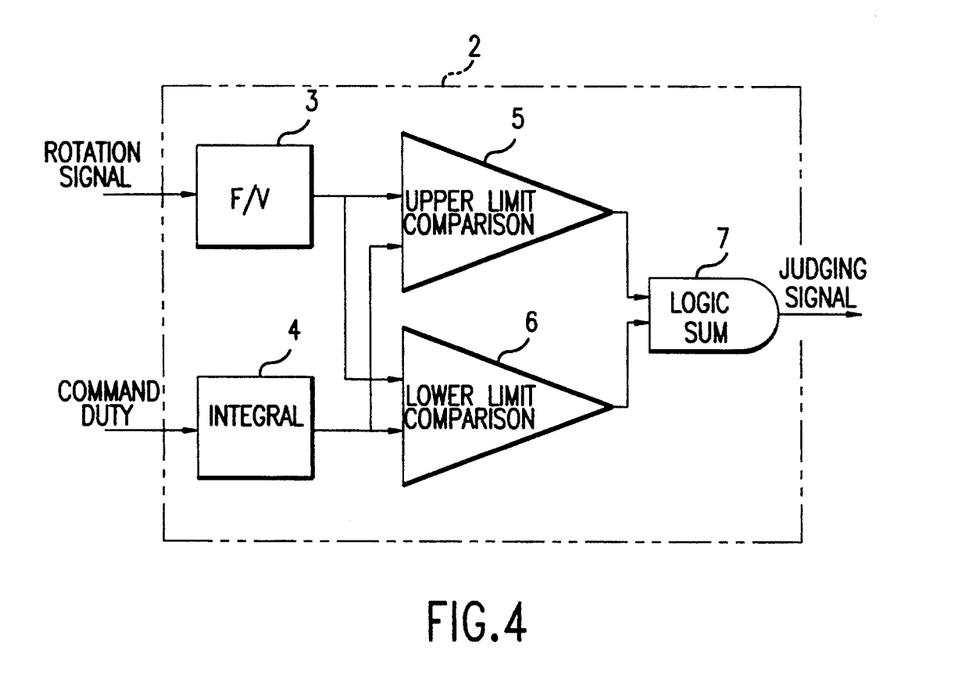
FIG. 4 is a block diagram of a judging means for the start-up control device.

In FIG. 4, the judging means 2 includes an F/V converter 3 for making F/V conversion of a rotation signal from the rotation detecting means 1, and integrating circuit 4 for integrating command duty signals (drive signals) which are applied to a pair of transistors of the drive circuit 10 from a control circuit 8 to be described afterward, comparators 5 and 6 for comparing if the outputs from the F/V converter 3 and the integrating circuit 4 are higher or lower than the predetermined upper limit respectively, or gate lower limit, and an OR circuit 7 for outputting a judgment signal indicating that the motor is not in a rotating state and the compressor is filled with the liquid refrigerant when the upper or lower limit is exceeded.

The control circuit 8 controls the rotation of the motor 25 by successively outputting a drive signal to a pair of transistors of the drive circuit 10 according to the aforementioned exciting pattern mode based on the commutation signal detected by the rotation detecting means 1 in ordinary drive control. Meanwhile, when a judging signal indicating that the compressor is filled with the liquid refrigerant is inputted from the judging means 2 at the start-up of the motor 25, the motor is step driven. In this case, commutation to the exciting coils U, V, and W are made through the drive circuit 10 so that the step driving is made so as to rotate the rotor 29 at a very slow speed such as one turn in one to several seconds. More precisely, commutation is made while holding the application of electric current to the exciting coils U, V, and W for a short time per exciting pattern. In practice, the rotor 29 is controlled to move stumblingly in the circumferential direction per exciting pattern. The step drive of the motor has the step numbers which is obtained by dividing 360 degrees by integral numbers of the number of phases of the applicable motor.

The operation of the start-up controller described above will be described with reference to FIG. 6.

Figure 6:
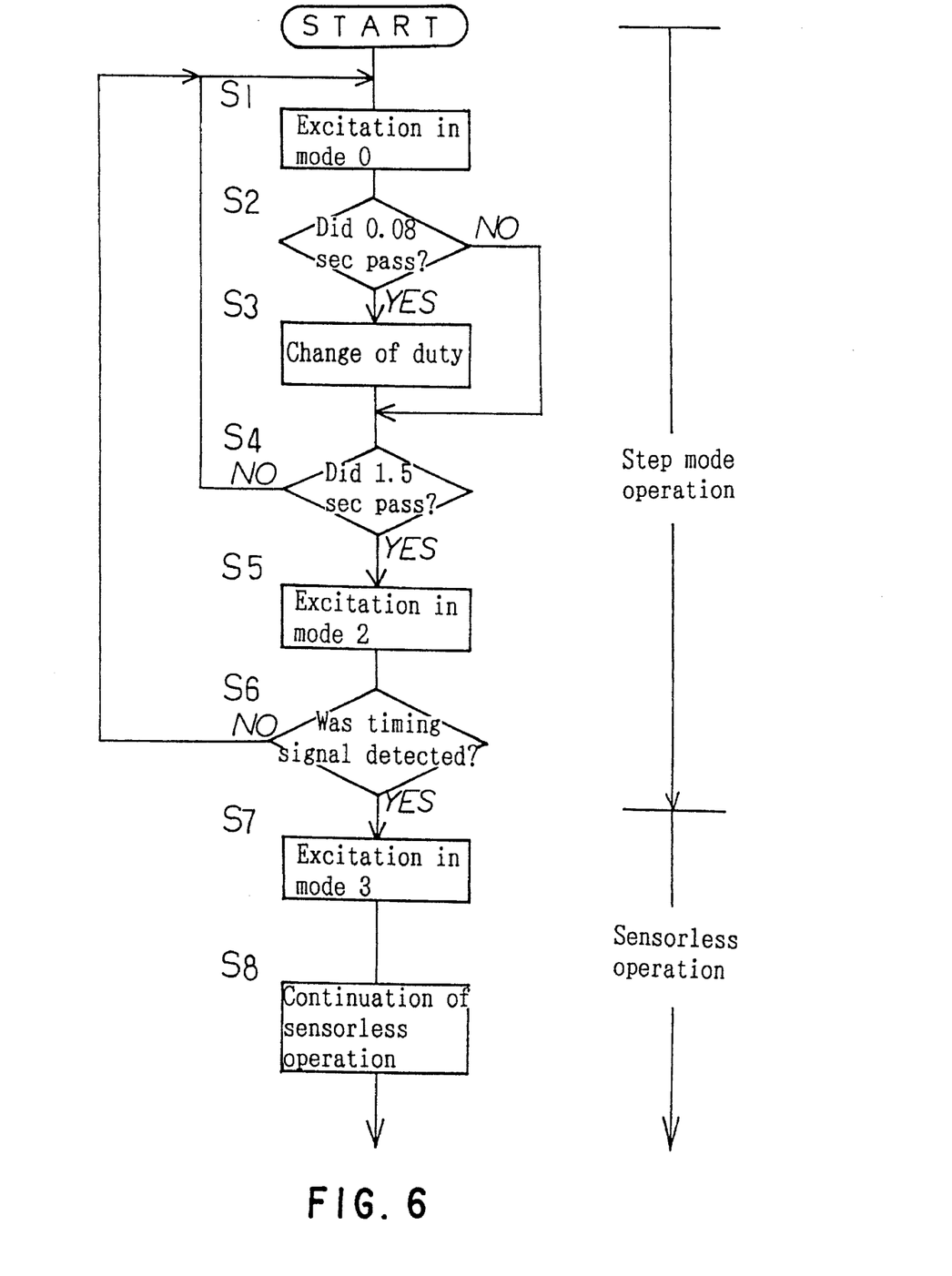
FIG. 6 is a flowchart of start-up control for the compressor.

According to the start-up command, step mode operation is first made for 1.5 seconds. Specifically, in the step mode operation, the exciting coil is excited based on a certain exciting mode in step S1. For example, among the modes shown in FIG. 5, application is made to a pair of transistors Tc+ and Tb− of the drive circuit 10 by the control means 8 to effect phase fixation so as to form the excitation pattern of mode 0. Then, in step S2, it is judged whether the electricity application state has passed for 0.08 second (prescribed time). If 0.08 second has not passed, it goes to step S4 but, if 0.08 second has passed, it goes to step S3.

In step S3, duty in excitation mode 5 is changed and it goes to step S4. In step S4, it is judged if 1.5 seconds have passed after the start-up. If 1.5 seconds have not passed, step S1 to step S4 are repeated until 1.5 seconds have passed. In other words, in steps S1 to S4, duty of excitation current is changed every 0.08 second for 1.5 seconds to make the excitation control of phase fixation. In this case, for the change of duty, the control means controls the switching of duty every 0.08 second so as to form a pseudo sine wave in 1.5 seconds. The changes of duty, excitation pattern mode, electrical angle 60° signal and motor current from the start at the step mode operation are shown in FIG. 7.

Figure 7:
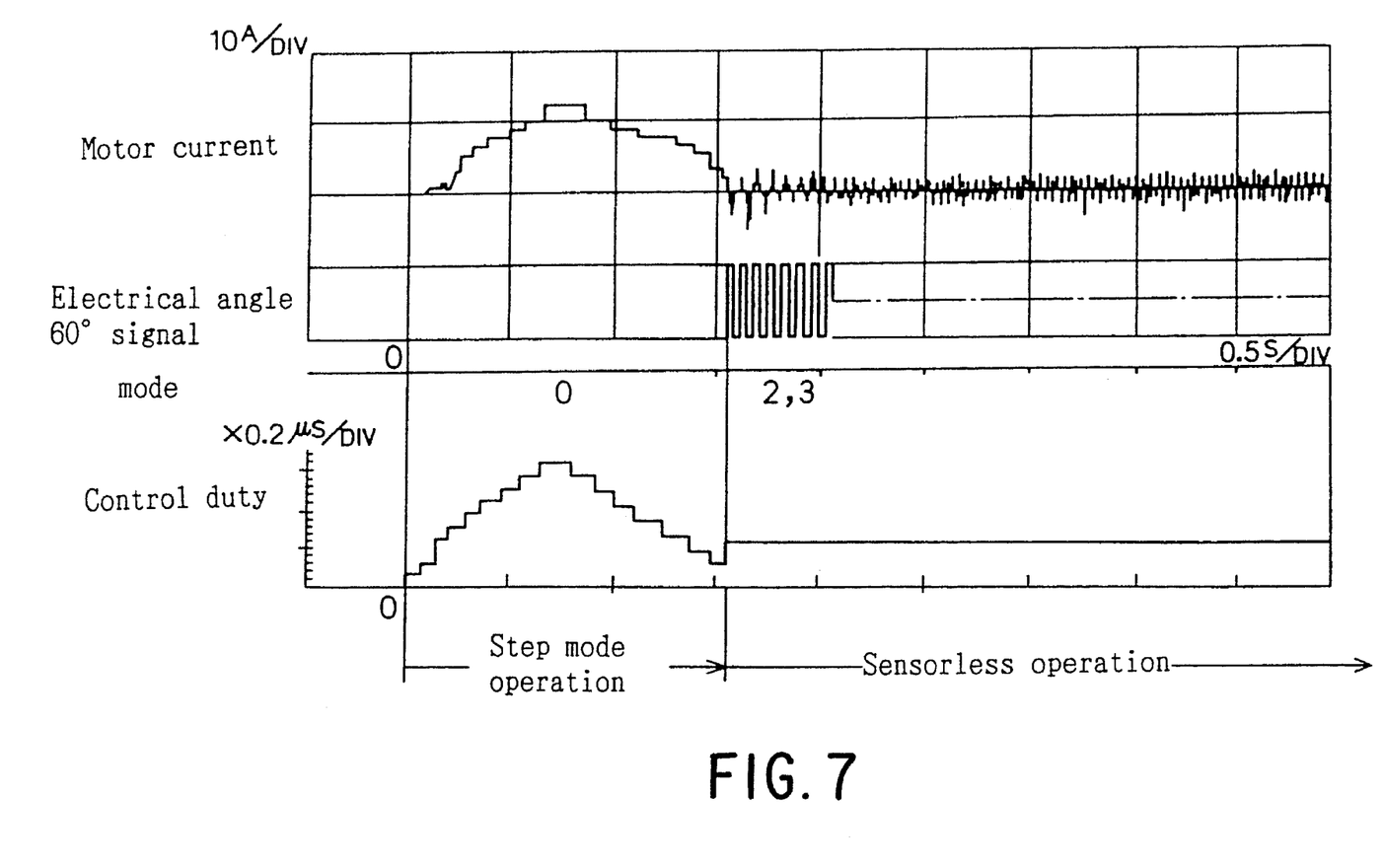
FIG. 7 is a graph showing the duty and motor current in a step mode operation.
Figure 8:
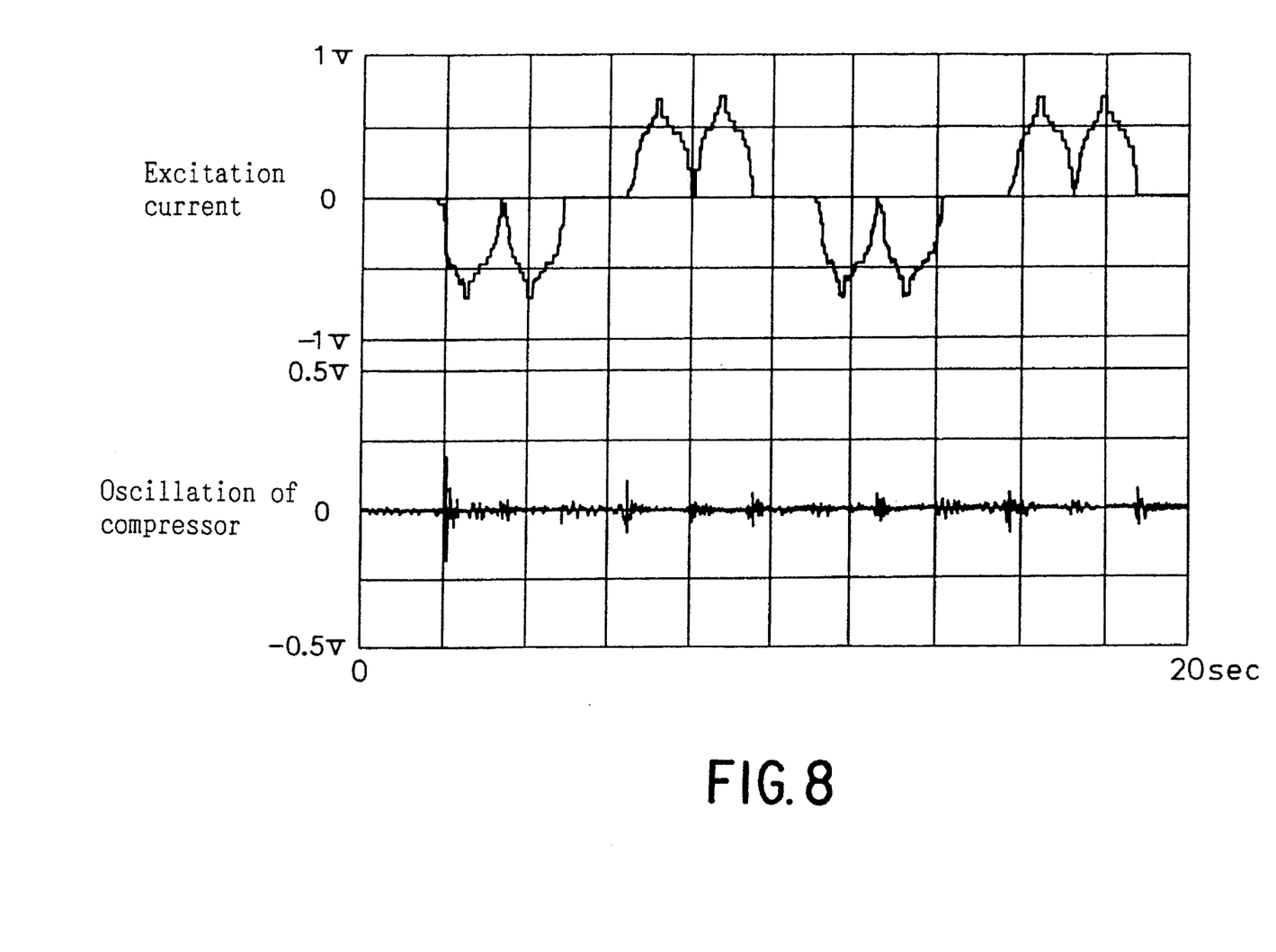
FIG. 8 is a graph showing the excitation current and oscillation characteristics of the compressor.

In FIG. 7, by switching successively the duty by means of the control means to form a pseudo sine wave in 1.5 seconds, the current supplied to the motor is formed in a pseudo sine wave. Consequently, the motor output is lowered and the motor rotates at a very slow speed. In this way, excitation is made in the preset mode order of excitation pattern and, accordingly, the rotor 29 moves successively in stumbling fashion according to each exciting pattern. Thus, the rotor makes a very slow rotation that it rotates once in one to several seconds, and the oscillation scroll member 33 of the compressor 20 oscillates with the rotational movement of the rotor 29 so that the liquid refrigerant in each compressor chambers 37, 38, and 39 is compressed and gradually discharged. As a result, the compressor itself operates as a pump, and the liquid refrigerant in the compressor is completely removed. Since the motor current at this time becomes a pseudo sine wave, the rate of change of exciting current waveform of the motor does not become sharp as prior art as shown in FIG. 9. Consequently, vibration of the compressor becomes quite small as shown in FIG. 8 even if there are backlash and residual gas.

When 1.5 seconds have passed in the above step S4, excitation is made to form the excitation pattern of mode 2 in step S5 and it is judged if the start-up is made in step S6. In judging the start-up, when the motor 25 is started by an exciting signal having a certain duty, if the interior of the compressor 20 is not filled with the liquid refrigerant, a ceratin rotation detection signal is detected by the rotation detecting means 1. However, if the interior of the compressor 20 is filled with the liquid refrigerant, a rotation detection signal with a certain value or more due to vibration of the rotor 29 is detected or no rotation signal is obtained. When a commutation timing signal is not detected due to the excitation in mode 2, it is judged that the liquid refrigerant in the compressor has not been removed and it goes back to step S1 and the step mode operation is repeated.

When the commutation timing signal is detected in step S6, the compressor 20 is not filled with the liquid refrigerant, the motor is excited as the start-up state in mode 3 in step S7, and normal motor control or position sensorless operation is made in step S8.

Thus, in this embodiment, at the start-up of the compressor, since the application of an electric current is controlled by successively switching duty to form a pseudo sine wave within a certain time, the electric current applied to the motor also has a pseudo sine wave, and the motor output is lowered so that the motor can be rotated at a very slow speed. Therefore, with the excitation in the preset mode order of excitation pattern, the rotor makes a very slow rotation such as once in one to several seconds, and the oscillation scroll member of the compressor oscillates with the rotational movement of the rotor, the liquid refrigerant in each compressor chamber is compressed and gradually discharged. As a result, the compressor itself operates as a pump, and the liquid refrigerant in the compressor is completely removed. Since the motor current at this time becomes a pseudo sine wave, the rate of change of exciting current waveform of the motor does not become sharp as prior art and vibration of the compressor becomes quite small even if there are backlash and residual gas.

In this embodiment, the compressor has been described with reference to the scroll type, but it is not limited to the scroll type but can be applied to other types including the rotary type. As to the control of the application of an electric current at the step mode operation, it is not limited to pseudo sine wave.

As described above, according to the invention, at the start-up of the compressor, the application of electricity is controlled to increase or decreased gradually commutating current at a very slow speed by the control means so that the motor output is lowered and the rotor can make a very slow rotation that it rotates once in a second or several seconds. Therefore, even if the interior is filled with the liquid refrigerant, the liquid refrigerant in each compressor chamber is compressed and discharged by the oscillation scroll member of the compressor which oscillates with the rotational movement at a very slow speed of the rotor. As a result, the compressor itself operates as a pump and the liquid refrigerant in the compressor can be surely removed. The motor current at this time become a commutating current of a very low speed to increase or decrease gradually so that the rate of change of exciting current waveform of the motor does not become so sharp as prior art, and vibration of the compressor can be made quite small even if there are backlash and residual gas.

We claim:

1. A compressor start-up controller comprising:

a compressing section for compressing a refrigerant;

a position sensorless DC motor connected to the compressing section for rotating the compressing section;

a drive circuit connected to the motor for driving the motor;

rotation detecting means connected to the drive circuit for detecting whether said motor is normally rotating;

control means connected to the drive circuit for operating the motor in a step mode at a very slow rotation at a time of start-up through the drive circuit for effecting electricity conducting control to increase or decrease gradually commutating current at a very slow speed during the step mode operation at the motor start-up time and for effecting sensorless operation of the motor when the rotation detecting means detects that the motor is normally rotating after the start-up time.

2. A compressor comprising:

a compressing section for compressing a refrigerant;

a position sensorless DC brushless motor for rotating said compressing section;

drive means connected to said motor for driving said motor;

rotation detecting means connected to said motor for detecting a counter electromotive force of said motor to provide a rotational signal indicating that said motor is under a normal or abnormal start condition at a start-up time;

judging means connected to said rotation detecting means for being responsive to said rotational signal and, if said rotational signal indicates an abnormal start condition, providing a judgement signal indicating that said compressor is filled with said refrigerant; and control means connected to said judging means for controlling said drive means so that said motor is driven in a step mode at a speed no more than one turn per second if said judging means indicates that said compressor is filled with said refrigerant.

3. A DC motor controller for a compressor comprising a compressing section for compressing a refrigerant and a position sensorless DC brushless motor for rotating said compressing section, said controller comprising:

drive means connected to said motor for driving said motor;

detecting means connected to said motor for detecting a counter electromotive force of said motor to provide a rotational signal indicating whether said motor is rotating or not;

judging means connected to said detecting means for being responsive to said rotational signal and, if said rotational signal indicates that said motor does not rotate, providing a judgement signal indicating that said compressor is filled with said refrigerant; and control means connected to said judgement means for controlling said drive means by switching commutating current so that said motor is driven in a step mode at a speed no more than one turn per second for a predetermined period of time if said judgement signal indicates that said compressor is filled with said refrigerant.

4. A DC motor controller according to claim 3, wherein said predetermined period of time is 1.5 seconds.

5. A DC motor controller according to claim 3, wherein said control means switches said commutating current at an interval of 0.08 second.

6. A DC motor controller according to claim 5, wherein said control means changes a duty of said commutating current at said interval, thereby providing a pseudo sine wave to suppress vibrations of said compressor.

* * * * *

UNITED STATES PATENT AND TRADEMARK OFFICE
CERTIFICATE OF CORRECTION

PATENT NO. : 5,518,373
DATED : May 21, 1996
INVENTOR(S) : Nobukazu Takagi, et al.

It is certified that error appears in the above-indentified patent and that said Letters Patent is hereby corrected as shown below:

On the title page, item [73] Assignee: change "Epson" to --Seiko Epson--.

Signed and Sealed this

Thirty-first Day of December, 1996

Attest:

BRUCE LEHMAN

Attesting Officer     Commissioner of Patents and Trademarks